United States Patent [19]

Taguchi et al.

[11] 4,357,099

[45] Nov. 2, 1982

[54] OPTICAL IMAGING SYSTEM

[75] Inventors: Katsumi Taguchi, Kobe; Yuji Nishioka, Kishiwada; Muneo Kuroda, Matsubara, all of Japan

[73] Assignee: Minolta Camera Kabushiki Kaisha, Osaka, Japan

[21] Appl. No.: 287,624

[22] Filed: Jul. 28, 1981

[30] Foreign Application Priority Data

Aug. 4, 1980 [JP] Japan .................. 55-107608

[51] Int. Cl.[3] .................................. G03B 27/44
[52] U.S. Cl. ............................... 355/46; 355/51
[58] Field of Search ............... 355/46, 50, 51, 1

[56] References Cited

U.S. PATENT DOCUMENTS

| | | | |
|---|---|---|---|
| 3,580,675 | 5/1971 | Hieber | 355/50 |
| 3,584,950 | 6/1971 | Gundlach | 355/50 |
| 3,655,284 | 4/1972 | Agliata | 355/46 |
| 3,788,740 | 1/1974 | Shogren | 355/51 |
| 4,141,649 | 2/1979 | Schnall et al. | 355/51 |
| 4,173,411 | 11/1979 | Massengeil et al. | 355/50 |

*Primary Examiner*—Monroe H. Hayes
*Attorney, Agent, or Firm*—Jackson, Jones & Price

[57] ABSTRACT

An optical imaging system for a copier comprising at least a pair of multilens plates made from the same mold to have matched surface configurations. One of the pair of multilens plates is arranged to be rotated from the position of the other multilens plate through 180 degrees about an axis parallel to the longitudinal direction of the other multilens plate. A reflecting surface is positioned parallel to the axis of rotation for deflecting the optical path between the pair of multilens plates once or an odd number of times whereby a clear image is provided despite imperfections from molding.

11 Claims, 10 Drawing Figures

OPTICAL IMAGING SYSTEM

BACKGROUND OF THE INVENTION

1. Field of the Invention

The present invention relates to an optical imaging system comprising a plurality of multilens plates, each having a plurality of lenses intricately molded together and spatially assembled to remove the effect of molding imperfections.

2. Description of the Prior Art

The prior art is aware of various forms of multilens plates, particularly in the copier field wherein they are frequently identified as "lenticular strips" for use in various optical imaging systems, such as slit exposure type optical systems for electrophotographic copying machines. One of the advantages of these optical systems are that they are relatively compact in construction and, therefore, complement the modern desire to provide compact copying machines.

Various examples of the prior art can be found in the patent literature, such as the Kaufer et al, U.S. Pat. No. 3,592,542, wherein lenticular bars are positioned relative to reflecting mirrors to provide strip-shaped erected images. The Gundlach U.S. Pat. No. 3,584,950 also shows a plurality of reflecting lens elements molded in strips with the lenses staggered along the length of the strip.

The Anderson U.S. Pat. No. Re. 28,162 suggests lens mosaics of plastic material that can be combined with spherical mirrors.

The Weber U.S. Pat. Nos. 3,694,076 and 3,836,249 are cited of general interest to disclose multiple lens-let plates that are operatively positioned with a reflective surface in a copier environment.

The prior art is still attempting to provide a compact optical imaging system that can be manufactured for a relatively low cost while providing minimum distortion and aberrations in the projected image.

SUMMARY OF THE INVENTION

The present invention is particularly adapted to compact electrophotographic copying machines and provides an improved optical imaging system wherein at least a pair of plastic lens plates can be mounted in an imaging system to complensate for any molding errors that could affect the optical performance. The lens plates are generally rectangular elongated members that carry an array of lenses. The lenses can be arranged, for example, in two staggered rows along a longitudinal axis of each plate to provide an elongated slit image. The lens plates have been molded from the same identical mold to provide matched surface configurations characteristic of that mold. Respective lens plates have first and second surfaces and first and second ends. The first plate can be positioned closer to the original document plane with its first surface optically facing that document plane. The second plate is positioned closer to the image plane with its first surface closer to the image plane. The respective first ends and second ends of the plates are aligned, that is, the first ends on the right hand side, the second ends on the left hand side. In essence, the spatial position of the respective plates are such that they are rotated 180 degrees about the longitudinal axis when mounted within the copier. Reflecting means are provided to reverse the image and in the present invention, to ensure an optical alignment of each lens whereby any molding errors that exist are accordingly matched and compensated so that a resulting clear image can be projected for copying purposes.

The objects and features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DESCRIPTION OF THE PREFERRED EMBODIMENTS

The following description is provided to enable any person skilled in the copier field to make and use the invention and sets forth the best modes contemplated by the inventors for carrying out their invention. Various modifications, however, will remain readily apparent to those skilled in the art, since the generic principles of the present invention have been defined herein specifically to provide a copier having an optical imaging system that is both compact and economical and that can be manufactured by economical methods.

Figure 1:
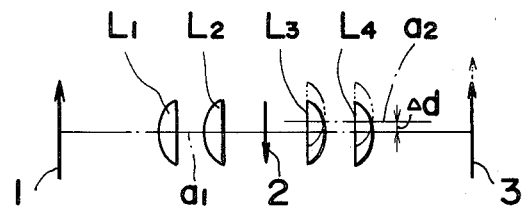
FIG. 1 is a view schematically showing an optical imaging system comprising pairs of lenses of the same shape in a symmetic arrangement.

A description of the initial development work will assist in highlighting the problem recognized and solved in the present invention. Referring to FIG. 1, a schematic cross sectional view of a compact erect optical system is disclosed. As can be appreciated from the perspective view of FIG. 2, the view shown in FIG. 1 is along an end direction and only four component lenses $L_1$ to $L_4$, aligned on the same optical axis, are shown for the respective multilens plates that are theoretically mmolded to provide identical shapes. The lenses $L_1$, $L_2$ are arranged with their convex surfaces facing an object plane 1 and form an inverted intermediate image 2 of the object 1. The lenses $L_3$, $L_4$ are arranged with their convex surfaces directed towards the image plane and relay or project the intermediate image 2 onto the image plane to form an erect image 3. As can be expected, this optical system is very useful, since all the four lenses can be of the same shape and theoretically molded from the same mold.

Figure 2:
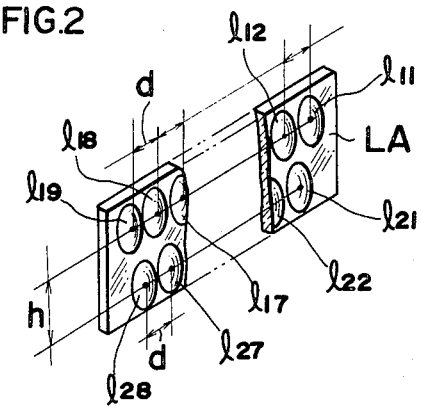
FIG. 2 is a perspective view showing an example of multilens plate.

When this optical system is used in a slit exposure type optical system, the multilens plates are arranged in the form of an integral strip carrying a plurality of identical lenses as seen in FIG. 2. The multilens plate of FIG. 2 has lenses $1_{11}$ to $1_{19}$ in a upper column and lenses $1_{21}$ to $1_{28}$ in a lower column with the respective individual lenses staggered to ensure an overlapping field angle from adjacent lens elements. The multilens plate is preferably molded from a transparent resin, such as an acrylic resin, by two dies as shown schematically in FIG. 3.

The first die 4 has concave portions 4a corresponding to the lenses of the multilens plate and tends to be mechanically separated from a second die 5 in the direction of an arrow b. The multilens plate, LA, can be produced, for example, by pouring or injecting a molten transparent resin into the space between the dies 4 and 5, cooling the resin, and thereafter separating the dies.

Figure 4:
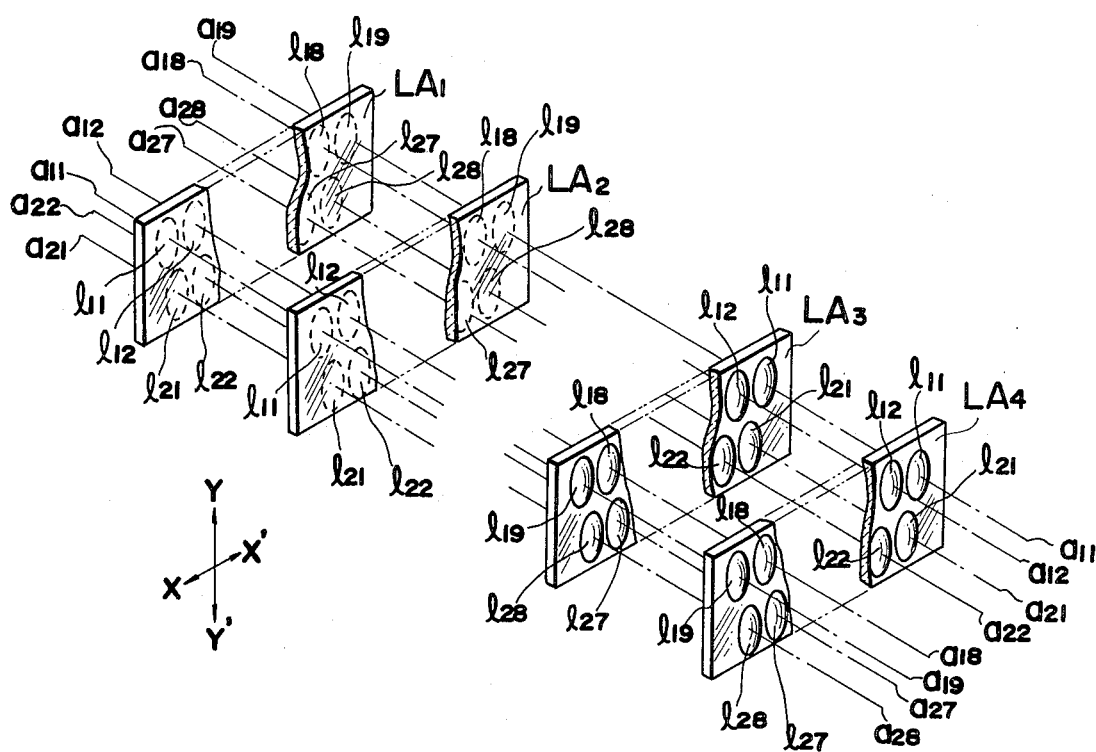
FIG. 4 is a perspective view showing an optical imaging system comprising multilens plates of the same shape.

When a series of four multilens plates, $LA_1$ to $LA_4$, each having an identical shape, are produced to, provide a composite lens system as, for example, shown in FIG. 4, it is necessary to spatially position each of the lens strips as set forth in FIG. 4. Thus, the respective multilens plates, $LA_3$, $LA_4$, must be arranged in a position rotated from the position of the plates $LA_1$, $LA_2$ to an angle of 180 degrees about the axis Y–Y'. If the lens plates $LA_3$, $LA_4$ were instead inverted about the axis of rotation X–X', at least one of the lenses at the end of the plate would not be operative in view of the staggered arrangement of lenses $1_{11}$ to $1_{19}$, $1_{21}$ to $1_{28}$, in the multilens plates $LA_1$ to $LA_4$.

As can be understood, each of the respective aligned individual lenses would constitute an optical system as can be readily visualized in the optical imaging system of FIG. 4. This optical imaging system will form an image of an object on the plane of projection in the form of a slit.

It was discovered, however, that when these multilens plates were actually arranged to provide such an optical imaging system, it was unexpectedly found that the imaging system formed a blurred image-forming plan. Research on the causes for the blurred image were undertaken by the inventors. The multilens plates LA must fulfill the requirement that the lenses $1_{11}$ to $1_{19}$ and $1_{21}$ to $1_{28}$ are arranged with the same axis-to-axis spacing d along the direction of the row of lenses and also with the same spacing h with respect to a direction perpendicular to the row as shown in FIG. 2. It was also found that the row of lenses $1_{21}$ to $1_{28}$ should be arranged in a manner displaced from the row of lenses $1_{11}$ to $1_{19}$ in the direction of the row by a distance corresponding to $\frac{1}{2}$ the spacing d. However, it was also found to be substantially impossible to produce multilens plates LA which fully fulfill these requirements in view of the conventional dimensional accuracy of the molding dies 4, 5 available. We have found that this is chiefly responsible for the blurred image. Stated more specifically, mechanical errors are inevitably involved in the making of the molding dies 4, 5 for producing multilens plates LA. Consequently, it is impossible to make the die 4 with the concave portions 4a per se so positioned as to fully satisfy the above requirements for corresponding relationships of the convex surfaces of the lenses $1_{11}$ to $1_{19}$, $1_{21}$ to $1_{28}$. Thus, it was substantially impossible to produce multilens plates LA that will fully meet the optical alignment requirements.

On the other hand, multilens plates LA, although not fulfilling the foregoing requirements, may still be usable insofar as they are made with use of the same dies 4, 5 when they are arranged as oriented in the same direction with respect to an optical path as is the case with the two multilens plates LA1, LA2, or LA3, LA4 of the optical imaging system of FIG. 4 wherein the optical axes of the respective lenses on each plate are in alignment with those of the other plates. Nevertheless, if one plate is positioned such that it can be considered to be rotated through 180 degrees to a symmetric position relative to another plate, as is the case with the two multilens plates LA2, LA3, the lenses $1_{11}$ to $1_{19}$, $1_{21}$ to $1_{28}$ of one plate are optically out of alignment with those of the other plate. In the former case, the lens $1_{11}$ of the multilens plate LA1 or LA3 is opposed to the lens $1_{11}$ of the other multilens plate LA2 or LA4. Thus, the lenses $1_{11}$ to $1_{19}$, and $1_{21}$ to $1_{28}$ of the respective plates LA1 and LA3 are positioned opposed to the lenses $1_{11}$ to $1_{19}$ and $1_{21}$ to $1_{28}$ of the other plates LA2 and LA4, and, hence, in optical alignment. In the latter case, however, the lens $1_{11}$ of the plate LA2, for example is opposed to the lens $1_{19}$ of the other plate LA3, so that the lenses $1_{11}$ to $1_{19}$, $1_{21}$ to $1_{28}$ of one plate are opposed to the lenses $1_{11}$ to $1_{19}$, $1_{21}$ to $1_{28}$ of the other plate LA3 which are not positioned in corresponding relation thereto, and would thereby fail to establish optical alignment. In the latter case, even when the multilens plates LA2 and LA3 are so positioned that the optical axis a19 of the lens $1_{19}$ of the plate LA2, for example, is aligned with the optical axis of the lens $1_{11}$ of the plate LA3, the relative positional relationship of the other optical axes a11 to a18, a21 to a28 of the other lenses $1_{11}$ to $1_{18}$, $1_{21}$ to $1_{28}$ with the optical axis a19 of the lens $1_{19}$ is not always the same as the optical axes a19 to a21, a28 to a21 of the lenses $1_{19}$ to $1_{12}$, $1_{28}$ to $1_{21}$ resulting in optical misalignment.

With reference to FIG. 1, the blurring of images is directly related with the misalignment of the optical axes. When the lenses L3, L4 of the system shown in FIG. 1 are in the dot-line position, i.e., when the optical axis a2 of the lenses L3, L4 is out of alignment with the optical axis a1 of the lenses L1, L2 by a distance $\Delta d$, the image 3 to be formed on the plane of projection will be formed at a position which differs from the desired position in corresponding relationship to the distance $\Delta d$, i.e., at the position indicated in a broken line. The image 3 thus projected is not blurred itself, but a composite image which appears blurred in its entirety will be formed by the optical system, such as the optical imaging system of FIG. 4, which comprises a plurality of systems like the one shown in FIG. 1, if the individual component systems form images 3 at positions unevenly different from the specified position.

Figure 3:
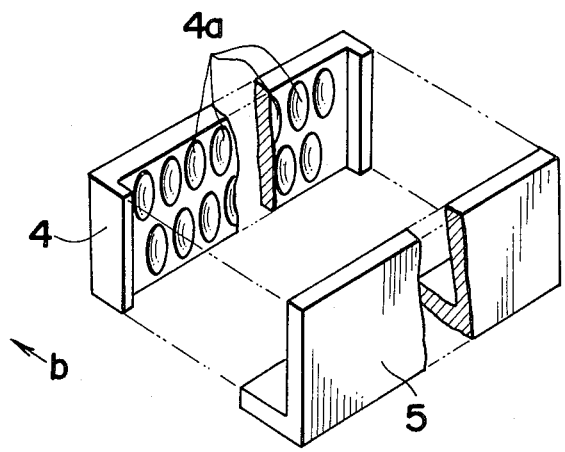
FIG. 3 is a perspective view of dies for molding multilens plates such as the one shown in FIG. 2.
Figure 5:
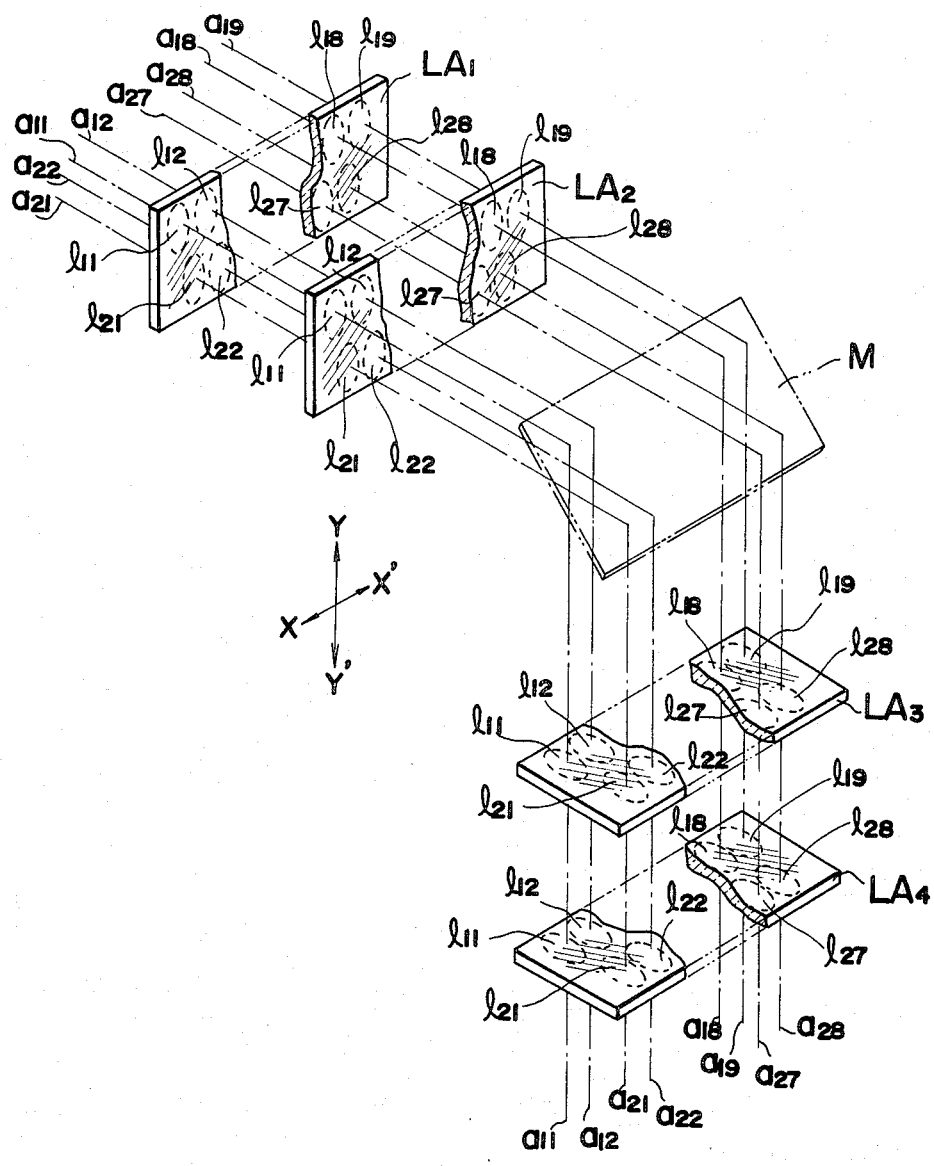
FIG. 5 is a perspective view showing an optical imaging system embodying the invention.

A first embodiment of the present invention is herein described with reference to FIGS. 5, 6 and 7. FIG. 5 shows multilens plates LA1 to LA4 made from an acrylic resin with the use of molding dies 4, 5, as shown in FIG. 3 and already described. Thus, the lens plate is produced by pouring or injecting molten acrylic resin into the space defined by the dies 4, 5 when fitted together, solidifying the resin and thereafter separating the die 4 from the die 5 in the direction of the arrow b. By using the same dies 4, 5 for molding each of the multilens plates LA1 to LA4, these plates are produced all in the same shape and to the same tolerances. The lens plates can be produced by various other methods, such as by casting, compression molding and injection molding, insofar as the plates are formed in the same shape. The multilens plates LA1 and LA4 each include staggered rows of lenses $1_{11}$ to $1_{19}$, and $1_{21}$ to $1_{28}$ which are arranged in the same manner as those of the multilens plate LA shown in FIG. 2. Also usable as lens plates LA1 to LA4 are those in which lenses $1_{11}$ to $1_{19}$ and $1_{21}$ to $1_{28}$ are arranged in more than two rows when so desired.

The multilens plates LA1, LA2, LA3, and LA4 are arranged oriented in the same direction relative to the optical path, and the optical axes all to $a_{19}$, $a_{21}$ to $a_{28}$ of the lenses $1_{11}$ to $1_{19}$, $1_{21}$ to $1_{28}$ of the plates LA1, LA2 and LA3, LA4 are aligned in a corresponding relation, for example, by aligning the same edges of the plates. The multilens plates LA1, LA2 and the multilens plates LA3, LA4 are rotated relative to each other through 180 degrees about an axis of symmetry, X–X', parallel to the longitudinal direction of the lens plates. The optical path between the multilens plates LA2 and LA3 is further deflected at 90 degrees by a plane reflecting mirror M so that the plates LA1, LA2 and the plates LA3, LA4 per se are arranged as rotated relative to each other through 270 degrees about the axis of rotation X–X'.

The plane reflecting mirror M has a reflecting plane parallel to the axis of rotation X–X' and is inclined at 45 degrees with respect to the optical path between the plate LA2 and the mirror M as well as between the mirror M and the plate LA3. Since the optical path between the multilens plates LA2 and LA3 is deflected by the plane reflecting mirror M once, the lenses $1_{11}$ to $1_{19}$, $1_{21}$ to $1_{28}$ of the plate LA3 are opposed, when seen optically, to the lenses $1_{11}$ to $1_{19}$, $1_{21}$ to $1_{28}$ of the plate LA2, as will be apprent from FIG. 5. For example, the lens $1_{11}$ of the plate LA3 is optically opposed to the lens $1_{11}$ of the plate LA2, and the lens $1_{12}$ of the former to the lens $1_{12}$ of the latter. The plane reflecting mirror M is replaceable by a prism or like reflecting member. Furthermore, the optical path can be deflected more than once, that is, invariably an odd number of times.

The multilens plates LA2 and LA3, as well as the plates LA1 and LA4, are so positioned, for example by being aligned at their corresponding edges, that the optical axes $a_{11}$ to $a_{19}$, $a_{21}$ to $a_{28}$ of the lenses $1_{11}$ to $1_{19}$, $1_{21}$ to $1_{28}$ of the plates are in alignment individually so that in each of the component systems, such as the one shown in FIG. 1, of the optical imaging system of FIG. 5, the lenses are optically in complete alignment. Accordingly, provided that the multilens plates LA1 to LA4 are from the same type mold and thereby of the same shape even when failing to fulfill the theoretical optical spacings of the above requirements, the optical imaging system will be free of the misalignment of optical axes described with reference to FIG. 4, although the individual optical axes may not be all parallel due to the misalignment. The optical imaging system shown in FIG. 5 and embodying the invention therefore has fully overcome the problem of blurred images experienced with the imaging system of FIG. 4. Despite the use of multilens plates which fail to meet the theoretical tolerance requirements mentioned, the system of the invention projects images with an outstanding quality as a result of a unique positioning array that intrinsically takes into account mold imperfections that effect precise alignment of individual lens elements. Thus, by maintaining a particular sequence of positioning of the lens plates with a reflective surface, the effects of spacing errors will be removed and a clear composite image will be provided.

Figure 6:
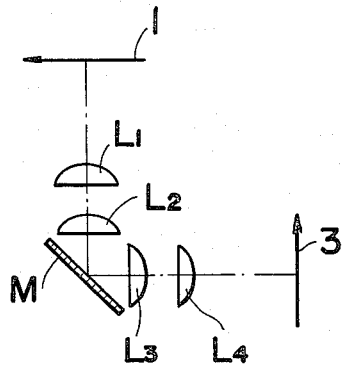
FIG. 6 is a side elevation schematically showing the same.

Since the optical imaging system of the invention shown in FIG. 5 forms an inverted image of the object 1 on projection, as seen in FIG. 6, there is a need to interpose an odd number of plane reflecting mirror(s) between the object and the multilens plate LA1 or between the multilens plate LA4 and the plane of projection, if it is desired to form an erect image 3 on the image forming plane.

Figure 7:
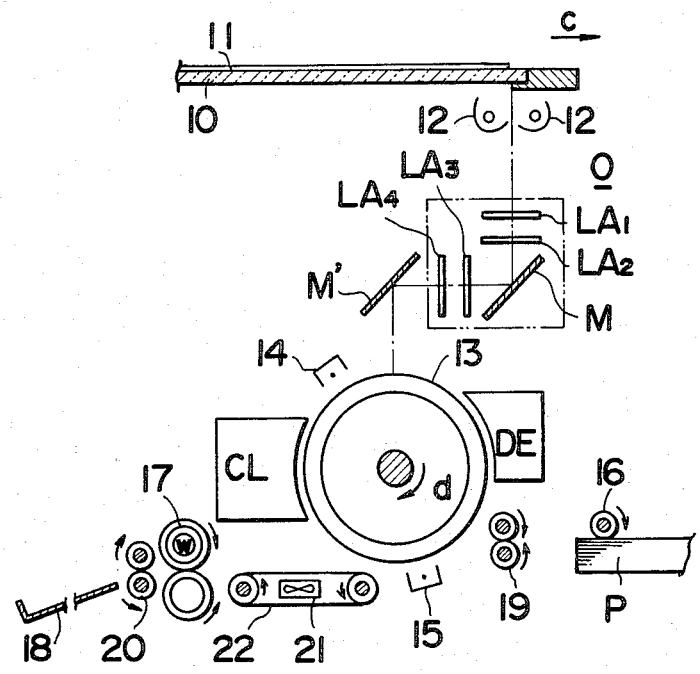
FIG. 7 is a diagram showing an electrophotographic copying machine having incorporated therein the optical imaging system of FIGS. 5 and 6.

With reference to FIG. 7, an electrophotographic copying machine including the optical imaging system of the present invention will be described below for illustrative purposes.

FIG. 7 shows an original carriage 10 which is movable forward in the direction of an arrow c and rearward in the opposite direction while carrying thereon the original 11 to be copied. During the forward movement, the image of the original 11 is illuminated in the form of a slit by a light source 12, while an image corresponding to the image of the original 11 is projected in the form of a slit on the surface of an electrophotographic photoconductive drum 13 by the optical imaging system O of the invention. Consequently, the surface of the drum 13 is exposed to the image. Between the optical imaging system O and the surface of the drum 13, there is provided a plane reflecting mirror M' so that a life-size erect image corresponding to the image of the original 11 is formed as the projected image on the surface of the drum 13.

The photoconductive drum 13 is drivingly rotated in the direction of an arrow d at a peripheral speed equal to the speed of movement of the carriage 10 in the direction of the arrow c. The drum 13 is uniformly charged by a charger 14 and thereafter exposed to the image by the optical imaging system O, whereby a latent electrostatic image corresponding to the image of the original 11 is formed on the drum surface. The drum 13 is surrounded by a latent image developing unit DE, a transfer charger 15 and a cleaner CL as arranged along the direction of the arrow d. Accordingly, the latent electrostatic image is developed by the developing unit DE to a toner image, which is electrostatically transferred by the action of the transfer charger 15 onto the surface of transfer paper P sent forward by a feed roller 16.

On the other hand, the paper P bearing the toner image transferred thereto is passed through a heat roller fixing unit 17 and delivered onto a tray 18. The drawing further shows rollers 19, 20 provided in the path of transport of the paper P for transporting the paper P. The paper P retaining the unfixed toner image on its surface is transported along the path by a conveyor belt 22 having an internal suction unit 21.

With the application of the present invention, the electrophotographic copying machine described produces copies with sharp images free of blurring and can be made very compact in construction.

Figure 8:
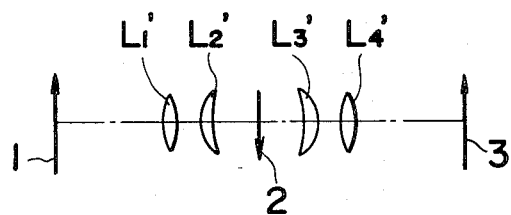
FIGS. 8 and 9 are views schematically showing another embodiment of optical imaging system comprising pairs of lenses of the same shape in a symmetric arrangement.
Figure 9:
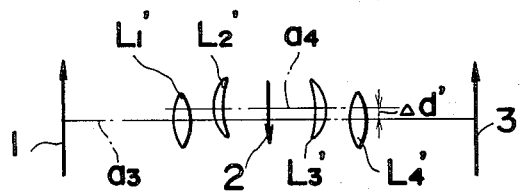

The optical imaging system of the invention is not limited to the foregoing embodiment but can be modified. For example, the lenses $1_{11}$ to $1_{19}$, $1_{21}$ to $1_{28}$ of the multilens plates LA1 to LA4 can be adapted to provide an optical imaging system, the principle of which is illustrated in FIG. 8. The optical imaging system of FIG. 8 comprises two pairs of lenses, each pair being composed of two lenses L1', L4' or L2', L3' which have an identical shape and are arranged symmetrically. The lenses of one pair are different from those of the other pair in shape. In this case, it is required that the lenses $1_{11}$ to $1_{19}$, $1_{21}$ to $1_{28}$ of the multilens plates LA2, LA3 have the same shape as the lenses L2', L3'. FIG. 9 shows the optical imaging system of FIG. 8 in which the optical axis a4 of the lenses L2', L3' is out of alignment with the optical axis a3 of the lenses L1', L4' by a distance d'. The misalignment, resulting from positioning between the lenses L2', L3' and the lenses L1', L4', is, however, consistent and matched for both lenses L2' and L3' and, accordingly, the resulting image, while not traveling on the predetermined design optical axis, is still clearly realized on the image plane and contributes to the overall composite image. Thus, even in this case, the image 3 formed on the plane of projection is positioned as specified. Thus, the above modification is fully useful insofar as the optical axes $a_{11}$ to $a_{19}$, $a_{21}$ to $a_{28}$ of the lenses $1_{11}$ to $1_{19}$, $1_{21}$ to $1_{28}$ of the lens plate LA1' are in alignment with those of the plate LA4', with similar optical alignment maintained for the lens plates LA2', LA3'.

Like the system of FIG. 5, the optical imaging system of FIG. 8 forms distinct images free of blurring when one miltilens plate in each pair LA1', LA4' or LA2', LA3' is arranged so as to be rotated from the position of the other multilens plane through 180 degrees about an axis parallel to the longitudinal direction of the other plate, LA2' and LA3' and parallel to the axis of rotation for deflecting the optical path an odd number of times.

Figure 10:
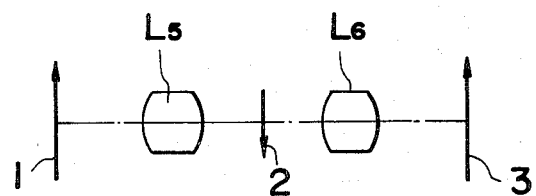
FIG. 10 is a view schematically showing another embodiment of optical imaging system comprising a pair of lenses of the same shape in a symmetric arrangement.

FIG. 10 shows another optical imaging system according to the invention which comprises a pair of lenses L5, L6 having the same shape and arranged symmetrically. In this case also, a pair of multilens plates corresponding to the lenses L5, L6 are provided symmetrically, with a reflecting plane disposed therebetween.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

We claim:

1. An optical imaging system comprising:
   at least one pair of multilens plates having a plurality of lenses molded from the same mold wherein one of the pair of multilens plates is operatively arranged so that its corresponding sides are rotated from a position relative to the other multilens plates sides through an angle of 180 degrees about an axis parallel to a longitudinal direction of the other multilens plate, and
   reflecting means having a reflecting surface parallel to the axis of rotation for deflecting the optical path between the pair of multilens plates once or an odd number of times.

2. An optical imaging system as claimed in claim 1 wherein said plurality of lenses are arranged in a plurality of rows on said multilens plates.

3. An optical imaging system as claimed in claim 2 wherein said plurality of lenses are arranged in a staggered manner on each multilens plate.

4. An optical imaging system comprising:
   two pairs of multilens plates having a plurality of lenses integrally molded from the same mold wherein one of each pair of multilens plates is positioned so that it is rotated from the position of the other multilens plate through an angle of 180 degrees about an axis parallel to the longitudinal direction of the other multilens plate, and
   reflecting means having a reflecting surface parallel to the axis of rotation for deflecting the common optical path between the pairs of multilens plates once or an odd number of times.

5. An optical imaging system as claimed in claim 4 wherein said plurality of lenses are arranged in a plurality of rows in said multilens plates.

6. An optical imaging system as claimed in claim 5 wherein said plurality of lenses are arranged in a staggered manner on each multilens plate.

7. An optical imaging system for an electrophotographic copying machine and for transmitting an optical image of an original from the original plane to the photosensitive surface comprising:
   at least one pair of multilens plates having a plurality of lenses integrally molded together and made in the same shape, wherein one of the pair of multilens plates is arranged to be rotated from the position of the other multilens plate through an angle of 180 degrees about an axis parallel to the longitudinal direction of the other multilens plate, and
   reflecting means having a reflecting surface parallel to the axis of rotation for deflecting the optical path between the pair of multilens plates once or an odd number of times.

8. An optical imaging system as claimed in claim 7 wherein said plurality of lenses are arranged in a plurality of rows on said multilens plates.

9. An optical imaging system as claimed in claim 8 wherein said plurality of lenses are arranged in a staggered manner on each multilens plate.

10. An optical imaging system as claimed in claim 7, further comprising reflecting means diposed between at least one of said pair of multilens plates and the original plane or the photosensitive surface for forming an erect image corresponding to the image of the original on the photosensitive surface.

11. In a compact electrophotographic copying machine having an improved optical imaging system for transmitting an optical image from an optical original document plane to an image plane comprising:
   a pair of plastic lens plates with respective arrays of lenses formed in at least two staggered rows along a longitudinal direction of each plate, the respective plates molded from the same mold to provide matched surface configurations characteristic of that mold, the respective plates having first and second surfaces, and first and second ends, the first plate is positioned closer to the original document plane with its first surface optically facing the document plane, the second plate is positioned closer to the image plane with its first surface closer to the image plane, the respective first and second ends are aligned on the same side,
   means for mounting the lens plates, and reflecting means to reverse the image and insure an optical alignment of each lens in the staggered rows whereby any spatial errors in the molding of the lenses are compensated and a clear elongated slit image is provided for copying purposes.

* * * * *